United States Patent
DeAscanis et al.

(10) Patent No.: US 9,494,487 B2
(45) Date of Patent: Nov. 15, 2016

(54) METHOD FOR INSPECTING A TURBINE ENGINE ROTOR WITH A THRU BOLT THREADS INSPECTION APPARATUS

(71) Applicant: Siemens Energy, Inc., Orlando, FL (US)

(72) Inventors: Joshua DeAscanis, Oviedo, FL (US); James P. Williams, Orlando, FL (US); Robert G. Shannon, Altamonte Springs, FL (US); Forrest R. Ruhge, Orlando, FL (US); Clifford Hatcher, Jr., Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 190 days.

(21) Appl. No.: 14/190,781

(22) Filed: Feb. 26, 2014

(65) Prior Publication Data

US 2015/0241303 A1    Aug. 27, 2015

(51) Int. Cl.
| | |
|---|---|
| H04N 5/225 | (2006.01) |
| G01M 15/02 | (2006.01) |
| H04N 5/247 | (2006.01) |
| H04N 5/232 | (2006.01) |
| F01D 5/06 | (2006.01) |
| F01D 21/00 | (2006.01) |

(Continued)

(52) U.S. Cl.
CPC .............. *G01M 15/02* (2013.01); *F01D 5/066* (2013.01); *F01D 21/003* (2013.01); *F04D 19/02* (2013.01); *H04N 5/2253* (2013.01); *H04N 5/23229* (2013.01); *H04N 5/247* (2013.01); *F04D 29/266* (2013.01); *F05D 2230/72* (2013.01); *F05D 2260/80* (2013.01); *H04N 2005/2255* (2013.01)

(58) Field of Classification Search
CPC ...... G01M 15/02; F01D 5/66; F01D 21/003; F01D 19/02; F01D 5/06; G01B 3/36; H04N 5/2253; H04N 5/247; H04N 5/23229; F04D 29/266; F05D 2230/72

USPC ..................................................... 348/82, 125
See application file for complete search history.

(56) References Cited

U.S. PATENT DOCUMENTS

| | | | | |
|---|---|---|---|---|
| 1,337,018 A | * | 4/1920 | Lockey ................... | G01B 5/204 33/199 R |
| 1,415,840 A | * | 5/1922 | Klausmeyer ............ | F16H 25/24 74/424.79 |
| 1,489,576 A | * | 4/1924 | Hanson .................... | G01B 3/40 33/199 R |

(Continued)

FOREIGN PATENT DOCUMENTS

| | | | |
|---|---|---|---|
| CN | 102927910 A | * | 2/2013 |
| CN | 2035663237 | * | 4/2014 |

(Continued)

OTHER PUBLICATIONS

Magdeev, machine generated translation of SU 1717937, Mar. 1992.*

*Primary Examiner* — David Harvey

(57) ABSTRACT

Turbine engine rotor corresponding thru-bolts and disc cavities are inspected with a camera inspection system that includes one or both of a thru-bolt male threads inspection apparatus and a rotor disc cavity inspection apparatus. The thru-bolts threads inspection apparatus engages the male threads and advances along the bolt threads pattern, selectively capturing camera images at desired spatial positions along the threads pattern. The plural camera threads images are desirably combined to form a composite image of a desired portion of or the entire thru-bolt male threads profiles, which aids their inspection evaluation and provides an archived composite image of the profiles.

14 Claims, 4 Drawing Sheets

(51) Int. Cl.
*F04D 19/02* (2006.01)
*F04D 29/26* (2006.01)

(56) References Cited

U.S. PATENT DOCUMENTS

| | | | | |
|---|---|---|---|---|
| 1,925,346 A * | 9/1933 | Summers | ............... | G01B 3/40 33/199 R |
| 2,196,922 A * | 4/1940 | Hybarger | ........... | G02B 21/0016 356/394 |
| 2,559,052 A * | 7/1951 | Wagstaff | ............... | B24B 33/081 451/483 |
| 2,609,614 A * | 9/1952 | Johnson | ................. | G01B 3/40 33/199 R |
| 2,784,494 A * | 3/1957 | Aldeborgh | ............... | G01B 3/40 33/199 R |
| 2,785,476 A * | 3/1957 | Swanson | ................. | G01B 3/40 33/199 R |
| 2,789,360 A * | 4/1957 | Finley | ...................... | G01B 3/40 33/199 R |
| 3,222,793 A * | 12/1965 | Johnson | ................. | G01B 3/40 33/199 R |
| 3,303,487 A * | 2/1967 | Mueller | ............... | G01D 5/2013 33/755 |
| 4,293,996 A | 10/1981 | Geary, Jr. | | |
| 4,644,394 A * | 2/1987 | Reeves | ................ | G01N 21/952 33/199 B |
| 4,939,845 A * | 7/1990 | Porter | ..................... | G01B 3/40 33/199 R |
| 4,989,331 A * | 2/1991 | Dodge | .................. | G01B 5/204 33/199 R |
| 5,260,780 A * | 11/1993 | Staudt, III | ........... | G01B 11/002 348/139 |
| 5,291,272 A * | 3/1994 | Demirsu | ............ | G01B 11/2425 356/639 |
| 2001/0001563 A1* | 5/2001 | Tomaszewski | .... | H04N 1/00241 348/552 |
| 2004/0093182 A1* | 5/2004 | Hart | ....................... | G01B 5/204 702/158 |
| 2007/0044652 A1* | 3/2007 | Dunn | ....................... | G01D 5/28 92/5 R |
| 2009/0071278 A1* | 3/2009 | Chiu | .................... | F16H 25/2204 74/424.82 |

FOREIGN PATENT DOCUMENTS

| | | | |
|---|---|---|---|
| DE | 10311390 A1 | * | 10/2004 |
| EP | 2733313 A2 | | 6/2014 |
| EP | 2818908 A1 | | 12/2014 |
| FR | 002935080 A1 | * | 2/2010 |
| GB | 190919746 A | * | 0/1910 |
| GB | 102573 A | * | 12/1916 |
| GB | 253509 A | * | 2/1927 |
| GB | 2248004 A | * | 3/1992 |
| JP | 61-076941 A | * | 4/1986 |
| JP | 2001343000 A | | 12/2001 |
| JP | 2009-192474 A | * | 8/2009 |
| KR | 20010064648 A | * | 7/2001 |
| KR | 438839 | * | 3/2008 |
| RU | 2151999 C1 | * | 6/2000 |
| SU | 1693352 A1 | * | 11/1991 |
| SU | 1717937 A1 | * | 3/1992 |
| WO | 2013045108 A1 | | 4/2013 |

* cited by examiner

METHOD FOR INSPECTING A TURBINE ENGINE ROTOR WITH A THRU BOLT THREADS INSPECTION APPARATUS

CROSS-REFERENCE TO RELATED APPLICATIONS

This application incorporates by reference in its entirety United States utility patent application entitled "METHOD FOR INSPECTING A TURBINE ENGINE ROTOR WITH A ROTOR DISC CAVITY INSPECTION APPARATUS" filed Feb. 26, 2014, Ser. No. 14/190,795.

BACKGROUND OF THE INVENTION

1. Field of the Invention

The invention relates to methods and apparatus for inspecting turbine engine rotor thru-bolts and their corresponding rotor disc cavities. More specifically, embodiments of the invention are directed to camera inspection apparatus and methods for inspecting thru-bolt male threads, thru-bolt outer circumference and the corresponding mating rotor disc cavity walls of a combustion turbine compressor or turbine section rotor. Embodiments of the invention facilitate creation of composite side-by-side images of the disc cavity wall and mating thru-bolt outer circumference as well as the bolt male threads profiles, for example to determine future serviceability during turbine engine maintenance.

2. Description of the Prior Art

Known turbine engines have rotors comprising a plurality of serially aligned rotor discs with a circumferentially spaced array of axially aligned rotor disc cavities. The rotor discs are axially retained by thru-bolts that are inserted in the axially aligned disc cavities from one axial end of the rotor. Referring to the combustion turbine engine 20 of FIG. 1, the compressor section rotor 22 has four rotor discs 24 that are retained by thru-bolts 26 and mating nuts 28 on both ends of the bolt. During periodic maintenance outages the rotor 20 is inspected for serviceability. During rotor service the rotor disc 24 and thru-bolt 26 interfaces are visually inspected after rotor disassembly. The thru-bolts 26 male threads that mate with the nuts 28 and the bolt outer circumference are inspected for conformity with component specifications. Similarly the disc 24 cavities that receive the thru-bolts 26 are visually inspected with a bore scope. During visual inspection portions of the thru-bolts 26 and disc 24 cavities may be photographed for remote inspection by others and for archival purposes.

SUMMARY OF THE INVENTION

The inventors have recognized a need to generate images of complete circumferential surfaces of thru-bolts (including their male threads) and disc cavity recesses along their entire respective mating axial lengths for inspection evaluation and for archival purposes.

Furthermore the inventors have recognized a need to map and correlate respective corresponding interface surfaces of the thru-bolt and of one or more of the sequentially aligned rotor disc cavities, for both inspection evaluation and archival purposes.

The inventors have also recognized a need and benefit of in situ evaluation of thru-bolt threads, the remainder of the bolt circumferential surface and the corresponding mating rotor disc cavity circumferential surface, without the need to disassemble the entire corresponding rotor structure.

Accordingly, a suggested object of embodiments of the invention is to create apparatus and methods for inspecting and generating images of complete circumferential surfaces of thru-bolts (including their male threads) and disc cavity recesses along their entire respective mating axial lengths.

Another object of embodiments of the invention is to create apparatus and methods for mapping and correlating respective corresponding interface surfaces of the thru-bolt and of one or more of the sequentially aligned rotor disc cavities;

Another object of embodiments of the invention is to create apparatus and methods for in situ evaluation of thru-bolt threads, the remainder of the bolt circumferential surface and the corresponding mating rotor disc cavity circumferential surface, without the need to disassemble the entire corresponding rotor structure.

These and other objects are achieved in one or more embodiments of the invention by a methods for inspecting turbine engine rotors with a camera inspection system that includes one or both of a thru-bolt male threads inspection apparatus and a rotor disc cavity inspection apparatus. The thru-bolts threads inspection apparatus engages the male threads and advances along the bolt threads pattern, selectively capturing camera images at desired spatial positions along the threads pattern. The plural camera threads images are desirably combined to form a composite image of a desired portion of or the entire thru-bolt male threads profiles, which aids their inspection evaluation and provides an archived composite image of the profiles. The disc cavity inspection scope apparatus is insertable in one or more of the desired rotor disc cavities and orients an attached inspection camera field of view generally transverse to the circumferential wall in the rotor disc that defines the cavity. Preferably inspection scope apparatus insertion into the disc cavities is performed with a motion control system that monitors spatial position of the camera field of view relative to the recess circumferential wall. The plural camera cavity circumferential wall images are desirably combined to form a composite image of a desired portion of or the entire disc cavity circumferential surface, which aids their inspection evaluation and provides an archived composite image of the surface.

Embodiments of the invention facilitate in situ inspection of the thru-bolt and disc cavity circumferential surfaces without disassembly of the entire rotor structure. Alternatively the inspection apparatus and methods of embodiments of the invention can be utilized on disassembled rotor discs and thru-bolts.

Besides creating composite images of the thru-bolt male threads, embodiments of the invention capture and create composite images of the remainder of the thru-bolt circumferential surface. Desirably in embodiments of the invention, composite images of corresponding thru-bolt and cavity recess mating spatial circumferential surfaces are oriented side-by-side for inspection and component serviceability evaluation.

Embodiments of the invention feature a turbine engine rotor thru-bolt threads inspection apparatus, including a collar clamp having a thru aperture defining a female threads profile for threaded engagement and advancement along corresponding male threads profile of a turbine engine rotor thru-bolt. In this embodiment a camera having a field of view for capturing images of thru-bolt threads is coupled to the collar.

Other embodiments of the invention feature a method for inspecting turbine engine rotor thru-bolt threads, by providing a thru-bolt threads inspection apparatus, including a collar clamp having a thru aperture defining a female threads profile for threaded engagement and advancement along corresponding male threads profile of a turbine engine rotor thru-bolt; and a camera having a field of view for capturing images of thru-bolt threads, coupled to the collar. The method is further practiced by mating and advancing the collar clamp female threads relative to the thru-bolt male threads; and selectively capturing images of the thru-bolt threads with the camera.

Additional embodiments of the invention feature a method for inspecting a turbine engine rotor thru-bolt and rotor disc cavity component interconnection, generally by inspecting and imaging external male threads of a thru-bolt and the external outer circumference of a remainder of the thru-bolt; and inspecting and imaging corresponding rotor disc cavities that circumscribe and capture the thru-bolt. Then corresponding spatially aligned portions of the bolt and disc cavity images are compared in order to evaluate mating thru-bolt and disc cavity suitability for field service. The external male threads of a thru-bolt are inspected by providing a thru-bolt threads inspection apparatus, including a collar clamp having a thru aperture defining a female threads profile for threaded engagement and advancement along corresponding male threads profile of a turbine engine rotor thru-bolt and a first camera having a field of view for capturing images of thru-bolt threads, coupled to the collar. A first data acquisition system and a first image processing system are coupled to the first camera. The collar clamp female threads are threaded into engagement with the thru-bolt male threads and the collar clamp is advanced along the thru-bolt male threads, capturing first plural images with the camera during the advancement. The first plural captured images are stored in the first data acquisition system; and combined with the first image processing system to form a composite image of the thru-bolt threads. The external outer circumference of a remainder of the thru-bolt is inspected by capturing second plural images thereof with a second camera coupled to a second data acquisition system and a second image processing system. The second plural captured images are stored in the second data acquisition system. The second plural captured images are combined with the second image processing system to form a composite image of the thru-bolt outer circumference. The rotor disc cavities are inspected by inserting a third camera coupled to a third data acquisition system and a third image processing system into a disc cavity. Third plural images of the disc cavity are captured with the third camera. The third plural captured images are stored in the third data acquisition system and combined with the third image processing system to form a composite image of the disc cavity. The corresponding spatially aligned portions of the second and third composite images are combined to evaluate mating thru-bolt and disc cavity suitability for field service. Any combination of the respective first, second and third cameras, data acquisition and/or image processing systems may be consolidated into combined sub systems. For example a single data acquisition and/or image processing system may be utilized to store and/or process first through third sets of images.

The respective objects and features of embodiments of the invention may be applied jointly or severally in any combination or sub-combination.

BRIEF DESCRIPTION OF THE DRAWINGS

Embodiments of invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, one will realize that the teachings of one or more embodiments of the invention can be readily utilized in a camera inspection system that includes one or both of a thru-bolt male threads inspection apparatus and a rotor disc cavity inspection apparatus. The thru-bolts threads inspection apparatus engages the male threads and advances along the bolt threads pattern, selectively capturing camera images at desired spatial positions along the threads pattern. The plural camera threads images are desirably combined to form a composite image of a desired portion of or the entire thru-bolt male threads profiles, which aids their inspection evaluation and provides an archived composite image of the profiles. The disc cavity inspection scope apparatus is insertable in one or more of the desired rotor disc cavities and orients an attached inspection camera field of view generally transverse to the circumferential wall in the rotor disc that defines the cavity. Preferably inspection scope apparatus insertion into the disc cavities is performed with a motion control system that monitors spatial position of the camera field of view relative to the recess circumferential wall. The plural camera cavity circumferential wall images are desirably combined to form a composite image of a desired portion of or the entire disc cavity circumferential surface, which aids their inspection evaluation and provides an archived composite image of the surface.

Embodiments of the invention can be utilized to inspect steam or combustion turbine engine rotors, the latter having both compressor and turbine section rotors. Exemplary embodiments of the invention described in further detail herein are directed to combustion turbine compressor section rotor inspection.

Figure 1:
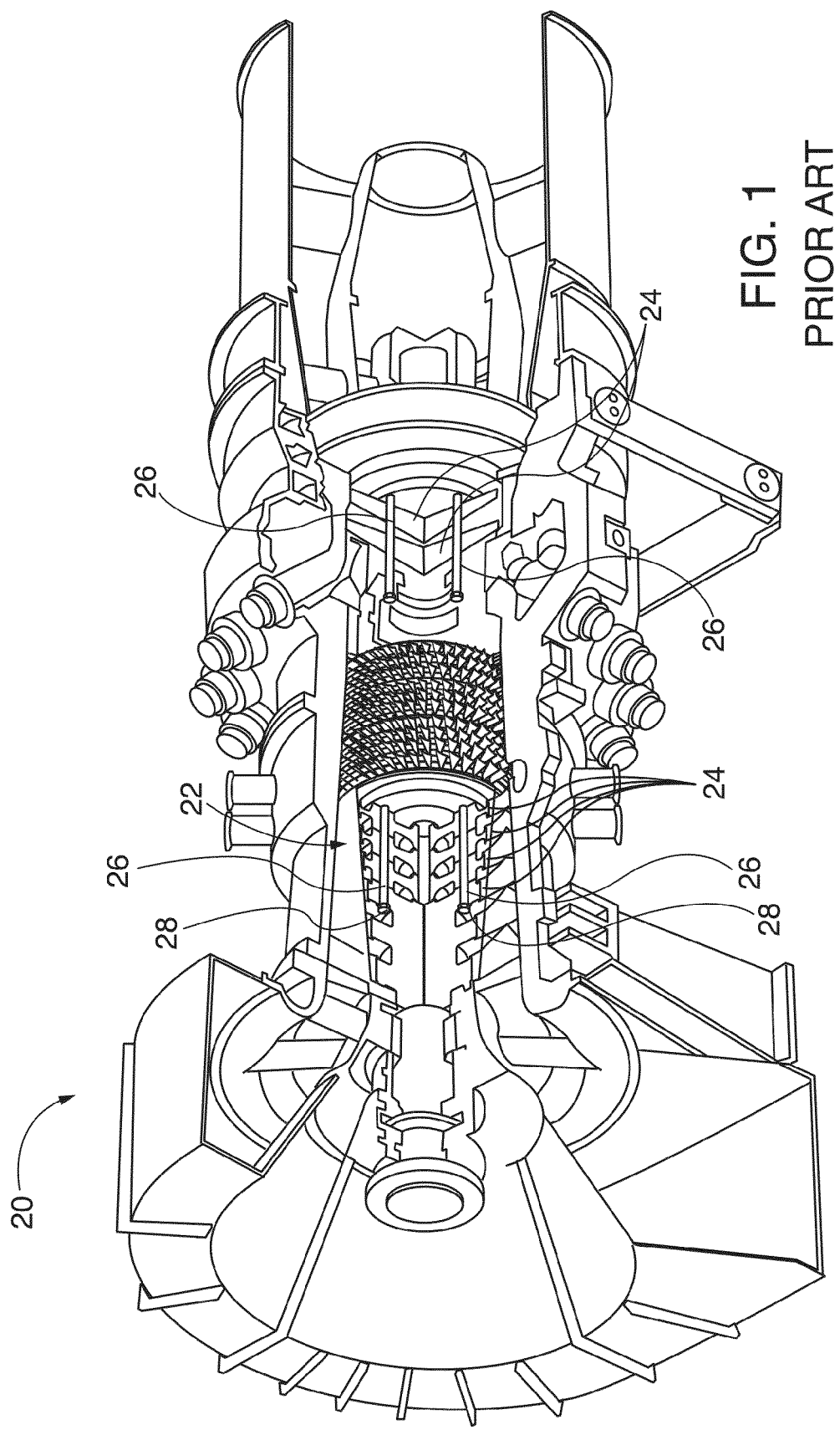
FIG. 1 is a perspective view of an exemplary known combustion turbine engine, with mating thru-bolts and rotor disc cavities in the compressor and turbine sections rotors shown in partial cross section.
Figure 3:
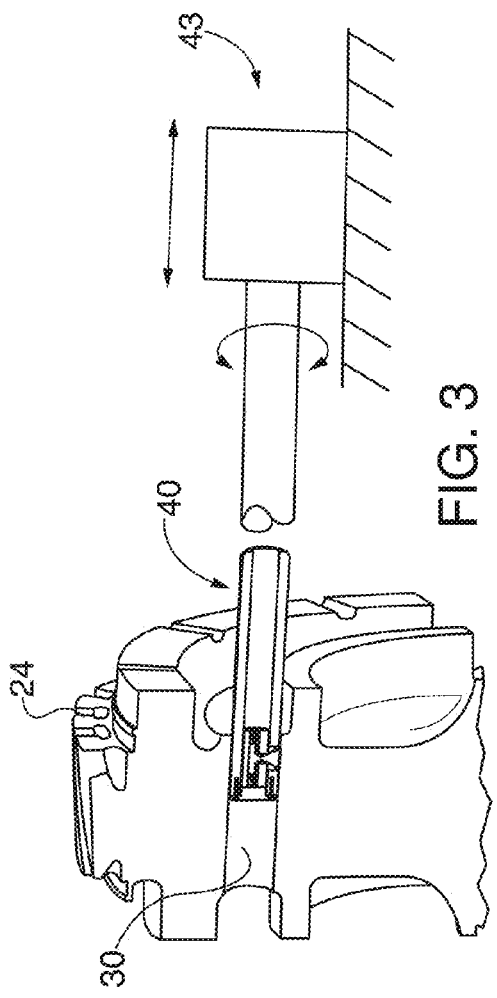
FIG. 3 is a perspective cross sectional view through the rotor disc cavity and disc cavity inspection apparatus of FIG. 2, taken along 3-3 thereof, along with a motion control system for rotating and translating the cavity inspection apparatus within the cavity.
Figure 2:
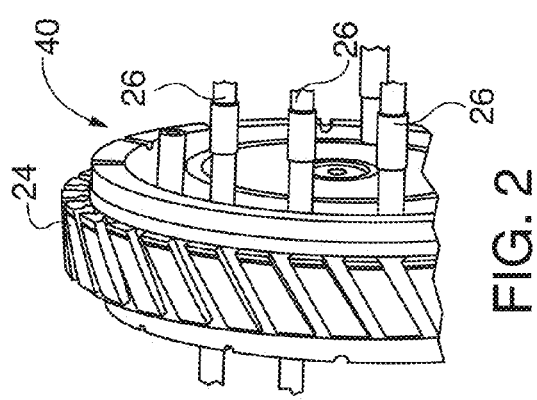
FIG. 2 is a schematic perspective view of an exemplary rotor disc and in situ thru-bolts, with a disc cavity inspection apparatus, in accordance with an embodiment of the invention, inserted in a vacant disc cavity after removal of its corresponding thru-bolt.
Figure 4:
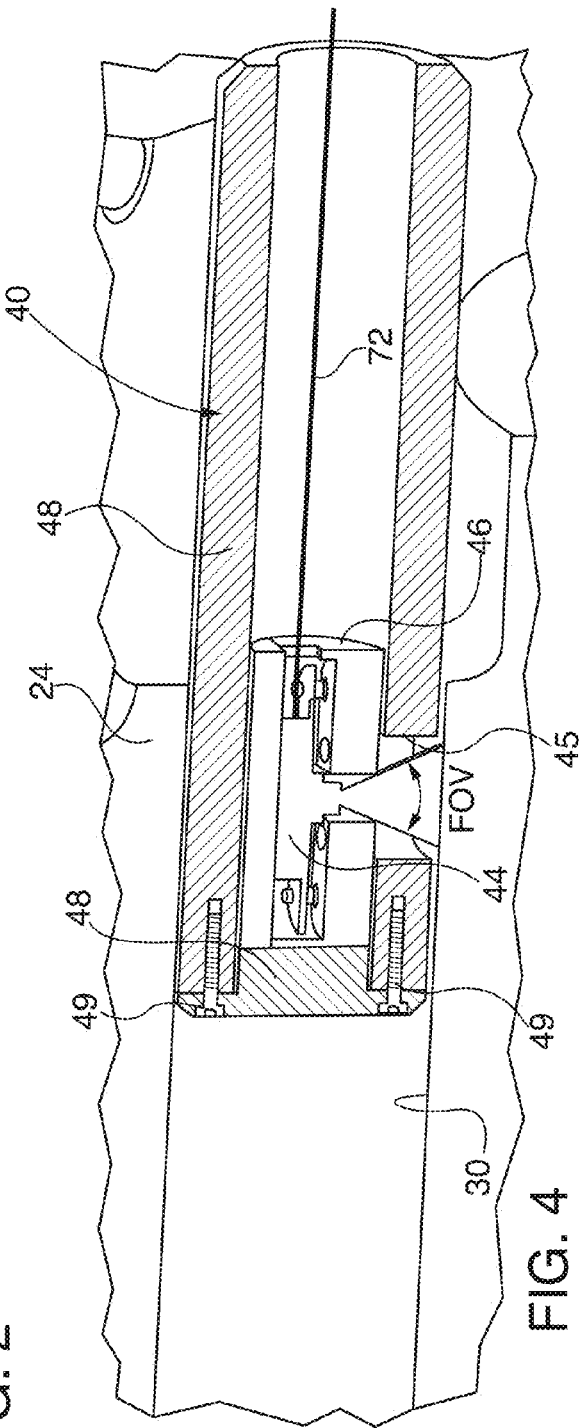
FIG. 4 is a detailed view of the disc cavity inspection apparatus of FIG. 3.

FIGS. 2-4 show an exemplary embodiment of a rotor disc cavity inspection scope apparatus 40, which is adapted for insertion into an axially sequentially aligned stack of rotor discs 24 through respective disc cavities 30 that is defined by a respective circumferential walls. To aid in comprehension of the operative environment of the disc cavity inspection scope 40, the rotor disc 24 is separated from it surrounding rotor discs, with all but one of the thru-bolts 26 remaining in situ. The vacant disc cavity 30 previously had its corresponding thru-bolt removed so that the cavity could be inspected, while the remainder of the rotor 22 remains assembled. Alternatively, the rotor 22 can be disassembled and disc cavities 30 of one or more of the rotor discs 24 can be inspected using the disc cavity inspection scope apparatus 40.

The disc cavity inspection scope 40 includes a scope shaft 42 that as shown has a generally tubular construction. Preferably the scope shaft 42 is coupled to a known motion control system 43 for axially translating and rotating the scope shaft, while monitoring the disc cavity inspection scope 40 position relative to the disc cavity 30 internal circumferences. A camera 44 is captured within a camera mounting sleeve 46 that is in turn coupled to the interior of the generally tubular scope shaft 42. An exemplary camera 44 is a known USB camera with 20 to 30 power magnification and 5 megapixel or higher resolution. The scope shaft has a circumferential scope shaft window 45 through with the camera lens field of view (FOV) is oriented generally transverse to a centerline of the scope shaft 42 and the disc cavity 30, so that the camera 44 captures images of the disc cavity circumferential surface. An end cap 48 is secured to the distal end of the scope shaft 42 with end cap screws 49.

Figure 5:
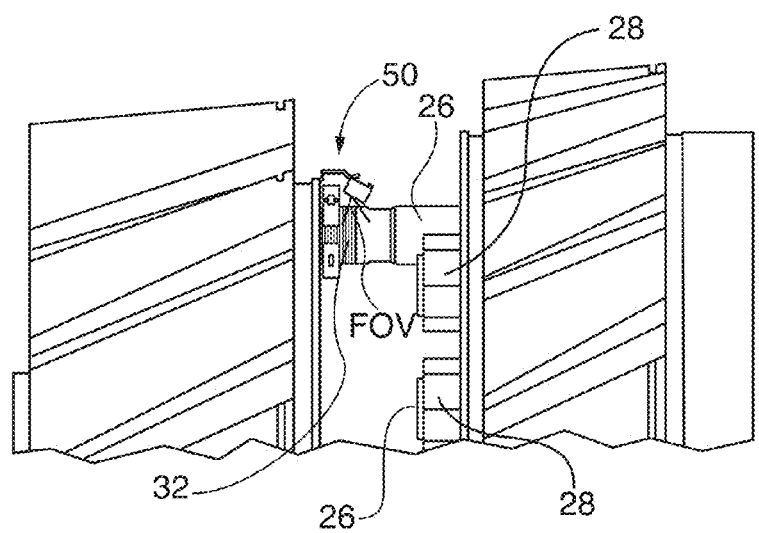
FIG. 5 is side elevational view of thru-bolts and mating nuts installed on an assembled rotor, with one in situ thru-bolt partially withdrawn from the rotor, its threads being inspected by a thread inspection apparatus, in accordance with an embodiment of the invention.
Figure 6:
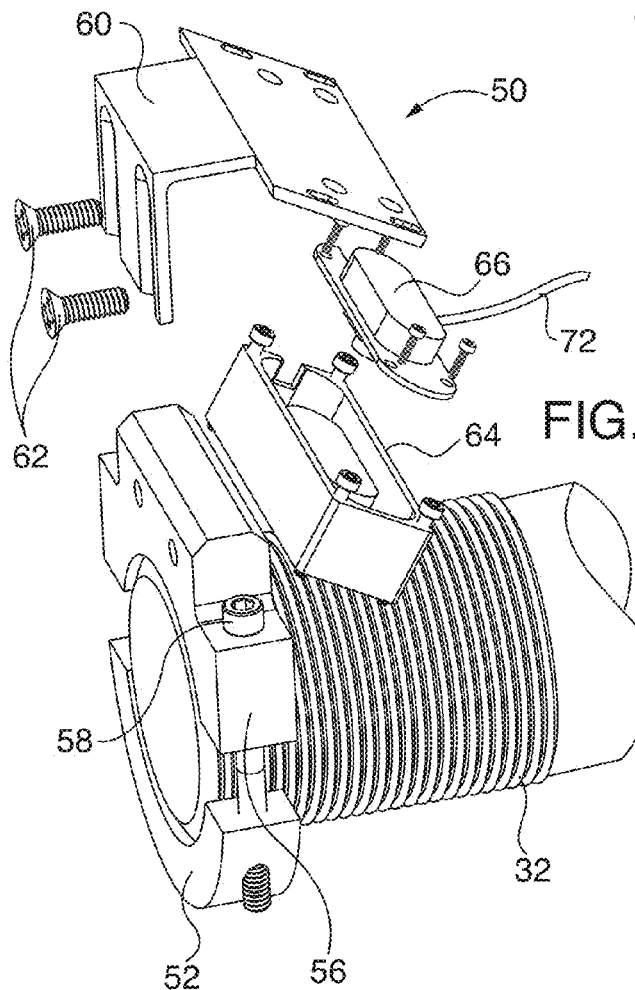
FIG. 6 is a partially exploded perspective view of the thread inspection apparatus of FIG. 5.
Figure 7:
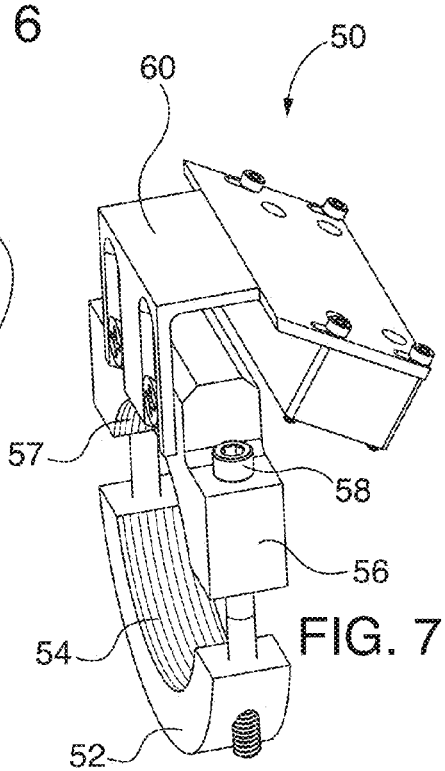
FIG. 7 is a perspective view of the thru-bolt threads inspection apparatus of FIG. 6.
Figure 8:
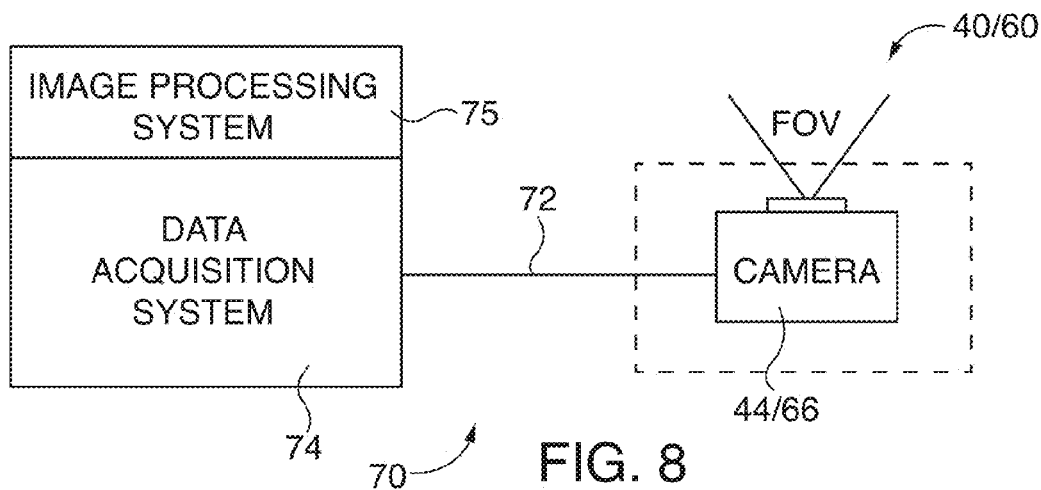
FIG. 8 is a schematic block diagram of a thru-bolt and rotor disc cavity inspection system, in accordance with an embodiment of the invention.

FIGS. 5-7 show an exemplary embodiment of a thru-bolt 26 male threads 32 inspection scope apparatus 50, which comprises a collar clamp formed from a clamp base 52 and a clamp cover 56 coupled together by clamp screws 58. The combined clamp base 52 and clamp cover 56 define a collar clamp through aperture. One or both of the clamp base 52 and clamp cover 57 have respective female threads 54, 57 that are defined within its respected half of the clamp collar. The threads 54, 57 have threads profiles (e.g., threads pitch and radial projection dimensions) that are capable of mating engagement and advancement relative to the thru-bolt male threads 32.

A camera bracket 60 is coupled to the clamp cover 56 by camera bracket screws 62 and to camera cover 64 that in turn retains camera 66. The camera bracket 60 orients the camera 66 field of view on the thru-bolt threads 32, so that images of the threads can be captured by the camera. An exemplary camera 66 is a known USB camera with 20 to 30 power magnification and 5 megapixel or higher resolution. The clamp collar 56/56 is selectively positioned axially and radially relative to the thru-bolt male threads 32, so that images of any portion of the threads pattern can be captured within the camera 66 field of view. As shown in FIG. 5, the entire outer size envelope of the thru-bolt inspection scope apparatus 50 is sufficiently small to maneuver the apparatus in space between rotor discs. In this inspection method the inspected thru-bolt 26 is withdrawn from its coupled axial position within the rotor disc stack for sufficient inspection clearance to allow relative rotation of the thru-bolt and the assembled collar clamp 52/56.

Figure 9:
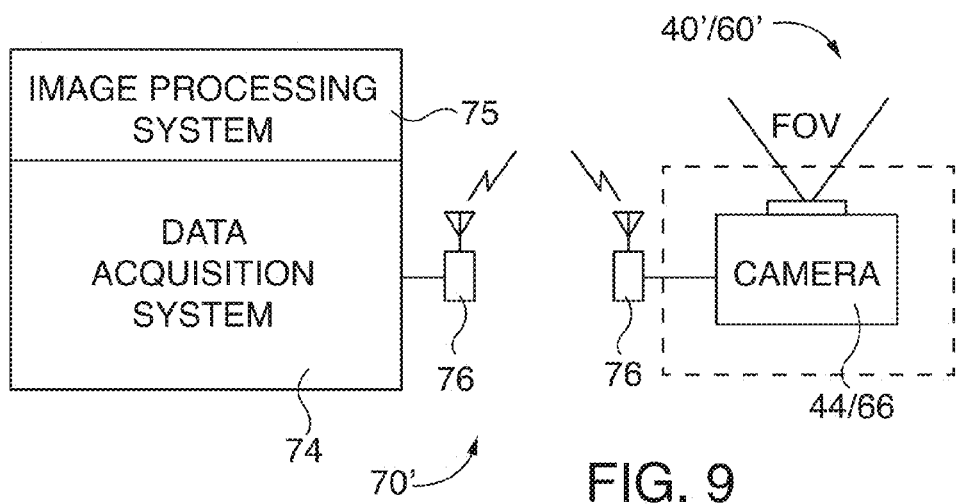
FIG. 9 is a schematic block diagram of a thru-bolt and rotor disc cavity inspection system, in accordance with another embodiment of the invention.

Respective disc cavity inspection scope apparatus 40/camera 44 or thru-bolt threads inspection apparatus 60/camera 66 captured images are acquired and processed in the exemplary inspection system 70 that is shown in FIG. 70. Images captured in a camera field of view (FOV) transferred via USB cable 72 to data acquisition system 74, which may include a known memory device. The USB cable 72 also provides power to the camera 44/66. Alternatively, as shown in the inspection system embodiment 70' of FIG. 9, camera images can be transmitted by known wireless devices and stored electrical power sources 76. The stored power source 76 also powers the camera 44/66. In either inspection system 70, 70' embodiment the acquired plural images are processed in an image processing system 75. Separate data acquisition systems 74 and image processing systems 75 may be utilized for each of the inspection thru-bolt thread 40 and disc cavity scope 50 apparatuses or they can be combined in a consolidated system. The data acquisition system and image processing system functions can be incorporated within a known personal computer or other known computational processing device, such as a client-server data processing system.

In either inspection system 70, 70' embodiment the acquired plural images are processed in an image processing system 75, which associates each image with its relative spatial position on the respective disc cavity 30 circumferential surface or thru-bolt threads 32 surface. Spatial information for each respective image is obtained from the motion control system 43 or by pre-assigned sequence of image and known camera position based on manual manipulation of a camera 44/66 field of view relative to the inspected circumferential surface. In this way composite images of selective portions of or the entire circumferential surface of a disc cavity 30 circumferential surface or thru-bolt threads can be constructed for inspection evaluation and image archiving.

Figure 10:
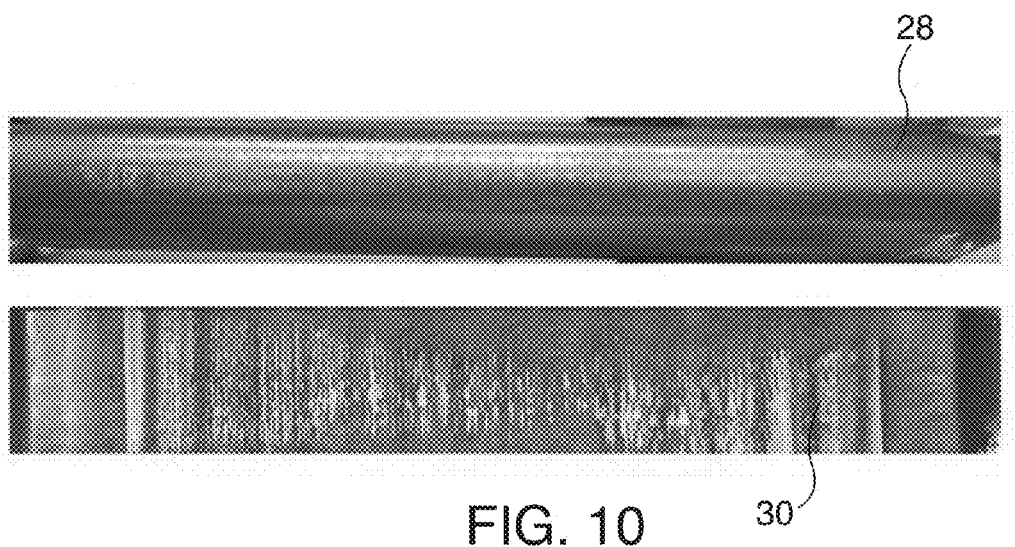
FIG. 10 are respective composite photographic images of portions of spatially corresponding opposed circumferential surfaces of a thru-bolt and mating rotor disc cavity, the images.

Beneficially, additional images of the remainder of the thru-bolt 26 outer circumferential surfaces can be acquired with a camera and those images can be combined in a data acquisition system 74/image processing system 75 to form a composite image of selective portions of or the entire thru-bolt circumference. An exemplary rotor disc cavity/thru-bolt interface inspection method is shown in FIG. 10. A composite axial image of a thru-bolt 26 outer circumference is axially aligned with a corresponding axial image of the mating disc cavity circumferential surface 30. Wear patterns on each of the respective thru-bolt 26 and disc cavity circumferential surface 30 can be compared to evaluate serviceability of those components for future use and also to diagnose past engine operational characteristics. While corresponding composite relative axial images are shown in FIG. 10, other relative corresponding image orientations can be constructed, such as 360 degree circumferential comparison images of a zone of interest.

The rotor thru-bolt/rotor disc cavity interface inspections described herein are performed in situ within an assembled rotor 22 by sequentially removing, capturing images of and reinstalling one thru-bolt of the array of thru-bolts. For example, a designated thru-bolt 26 can be partially withdrawn to inspect only its male threads 32 with the thread inspection scope apparatus 50. The thru-bolt 26 can be withdrawn in its entirety or incrementally rotor disc-by-rotor disc so that desired corresponding rotor disc cavities 30 can be inspected with the disc cavity inspection scope apparatus 40. If the thru-bolt 26 is withdrawn fully from the rotor 22 its outer circumference can be imaged for beneficial inspection comparison with the corresponding disc scope cavity 30 images. Alternatively the rotor 22 can be disassembled for separate inspection of rotor discs 24 and thru-bolts 26, utilizing the exemplary inspection apparatus 40, 50 and related inspection systems 70, 70'.

Although various embodiments that incorporate the teachings of the invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for inspection of turbine engine rotor thru-bolt threads and external outer circumference of a remainder thereof, comprising:
   providing a thru-bolt threads inspection apparatus, including:
      a collar clamp having a thru aperture defining a female threads profile for threaded engagement and advancement along corresponding male threads profile of a turbine engine rotor thru-bolt; and
      a camera having a field of view for capturing images of thru-bolt threads or remainder of its outer circumference, coupled to the collar;
      a data acquisition system and an image processing system coupled to the camera;
   (a) inspecting external male threads of a provided thru-bolt by:
      mating and threading the bolt threads inspection apparatus collar clamp on the exposed thru-bolt male threads;
      advancing the collar clamp female threads relative to and along the thru-bolt male threads; and
      selectively capturing first plural images of the thru-bolt threads with the camera during the advancement;
      storing the first plural captured images in the data acquisition system;
      combining the first plural captured images with the image processing system to form a composite image of the thru-bolt threads;
   (b) inspecting external outer circumference of a remainder of the provided thru-bolt by:
      opening the collar clamp, so that its threads slide over an outer circumference of a remainder of the thru-bolt, capturing second plural images thereof with the camera coupled to the data acquisition system and the image processing system;
      storing the second plural captured images in the data acquisition system; and
      combining the second plural captured images with the image processing system to form a composite image of the thru-bolt remainder of its outer circumference; and
   (c) combining the thru-bolt threads and remainder of its outer circumference composite images to form an overall image of the thru-bolt.

2. The method of claim 1, the provided camera comprising
   a USB camera that is coupled to the data acquisition system.

3. The method of claim 1, further comprising:
   removing one thru-bolt nut from a single thru-bolt, leaving the remaining thru-bolts fastened to the rotor; and
   withdrawing the thru-bolt from the rotor prior to threading the bolt threads inspection apparatus collar clamp on the exposed threads.

4. The method of claim 3, further comprising reinstalling an inspected thru-bolt; and
   sequentially inspecting and reinstalling other thru-bolts that are coupled to the rotor.

5. A method for inspecting a turbine engine rotor thru-bolt and rotor disc cavity component interconnection, comprising:
   (a) inspecting external male threads of a thru-bolt by:
      providing a thru-bolt threads inspection apparatus, including:
         a collar clamp having a thru aperture defining a female threads profile for threaded engagement and advancement along corresponding male threads profile of a turbine engine rotor thru-bolt;
         a first camera having a field of view for capturing images of thru-bolt threads, coupled to the collar; and
         a first data acquisition system and a first image processing system coupled to the first camera;
      threading the collar clamp female threads with the thru-bolt male threads;
      advancing the collar clamp along the thru-bolt male threads, capturing first plural images with the camera during the advancement;
      storing the first plural captured images in the first data acquisition system; and
      combining the first plural captured images with the first image processing system to form a composite image of the thru-bolt threads;
   (b) inspecting external outer circumference of a remainder of the thru-bolt by:
      capturing second plural images thereof with a second camera coupled to a second data acquisition system and a second image processing system;
      storing the second plural captured images in the second data acquisition system; and
      combining the second plural captured images with the second image processing system to form a composite image of the thru-bolt outer circumference;
   (c) inspecting corresponding rotor disc cavities that circumscribe and capture the thru-bolt by:
      inserting a third camera coupled to a third data acquisition system and a third image processing system into a disc cavity;
      capturing third plural images of the disc cavity with the third camera;
      storing the third plural captured images in the third data acquisition system; and
      combining the third plural captured images with the third image processing system to form a composite image of the disc cavity; and (d) comparing corresponding spatially aligned portions of the second and third composite images to evaluate mating thru-bolt and disc cavity suitability for field service.

6. The method of claim 5, performed on thru-bolts and rotor disc cavities of a disassembled rotor.

7. The method of claim 5, performed on assembled rotor, comprising:
- removing one thru-bolt nut from a single thru-bolt, leaving the remaining thru-bolts fastened to the rotor;
- withdrawing the thru-bolt from the rotor disc cavities and capturing the first and second plural images of the now exposed thru-bolt;
- inserting the third camera into the now vacant corresponding disc cavities and capturing the third plural images; and
- sequentially withdrawing other thru-bolts, inspecting their respective thru-bolt threads and outer circumference, inspecting their respective corresponding rotor disc cavities and reinstalling the thru-bolt.

8. The method of claim 5, performed on assembled rotor, comprising:
- removing one thru-bolt nut from a single thru-bolt, leaving the remaining thru-bolts fastened to the rotor;
- capturing the first plural images on the now exposed thru-bolt male threads;
- withdrawing the thru-bolt from the rotor disc cavities and capturing the second plural images of the now exposed thru-bolt outer circumference;
- inserting the third camera into the now vacant corresponding disc cavities and capturing the third plural images; and
- sequentially withdrawing other thru-bolts, inspecting their respective thru-bolt threads and outer circumference, inspecting their respective corresponding rotor disc cavities and reinstalling the thru-bolt.

9. The method of claim 5, the provided thru-bolt threads inspection apparatus further comprising a split collar clamp having a clamp base and a clamp cover; coupled together and defining the thru aperture.

10. The method of claim 9, the provided thru-bolt threads inspection apparatus further comprising one or both of the clamp base or clamp cover defining the female threads profile.

11. The method of claim 9, the provided thru-bolt threads inspection apparatus further comprising clamp screws for coupling the clamp base to the clamp cover.

12. The method of claim 5, the provided thru-bolt threads inspection apparatus further comprising a camera housing retaining the camera; and a camera bracket coupling the camera housing to the collar clamp, orienting the camera field of view transverse to a central axis of the clamp thru aperture.

13. The method of 5, the provided thru-bolt threads inspection apparatus camera comprising a USB camera having an approximately 20 to 30 power magnification field of view.

14. The method of claim 5, the provided thru-bolt threads inspection apparatus camera coupled to a data acquisition system for receiving images generated by the camera.

* * * * *